United States Patent [19]

Wallbillich

[11] Patent Number: 4,876,118

[45] Date of Patent: Oct. 24, 1989

[54] NEGATIVE CORRECTION OF GRAVURE PRINTING PLATES

[75] Inventor: Guenter Wallbillich, Neustadt, Fed. Rep. of Germany

[73] Assignee: BASF Aktiengesellschaft, Ludwigshafen, Fed. Rep. of Germany

[21] Appl. No.: 174,359

[22] Filed: Mar. 25, 1988

[30] Foreign Application Priority Data

Mar. 31, 1987 [DE] Fed. Rep. of Germany ....... 3710145

[51] Int. Cl.[4] ............................................ B32B 35/00

[52] U.S. Cl. .................................. 427/142; 427/140; 427/367; 427/387; 427/385.5; 427/388.1; 427/388.5

[58] Field of Search ............... 427/140, 142, 369, 387, 427/385.5, 388.1, 388.5

[56] References Cited

U.S. PATENT DOCUMENTS 4,178,465 12/1979 Caporiccio et al. ................ 568/601
4,396,703 8/1983 Matsumoto et al. ................ 427/140
4,453,991 6/1984 Grot .................................... 427/140
4,504,528 3/1985 Zucker et al. .................... 427/385.5

FOREIGN PATENT DOCUMENTS 2633736 3/1971 Fed. Rep. of Germany .

OTHER PUBLICATIONS

Abstract JP-A-5 5157-742, Japan.
Abstract JR-A-55 140 846, Japan.

*Primary Examiner*—Stanley Silverman
*Attorney, Agent, or Firm*—Keil & Weinkauf

[57] ABSTRACT

Negative correction of gravure printing plates by filling undesirable depressions in the printing layer of the gravure printing plate with a correcting agent is carried out by a method in which the correcting agent used is a pasty material which is viscoplastic at room temperature and is based on a dispersion of a solid, highly fluorinated olefin polymer powder in an inert, sparingly volatile, organic dispersing liquid.

13 Claims, No Drawings

NEGATIVE CORRECTION OF GRAVURE PRINTING PLATES

A method for the negative correction of gravure printing plates.

The present invention relates to a method for negative correction of gravure printing plates by filling undesirable depressions in the printing layer with a correcting agent, and furthermore relates to a correcting agent for use in this method.

In gravure printing, the ink is transferred from ink-holding depressions, i.e. wells, in the surface of the printing plate, to the material being printed. Excess ink still present on the surface of the printing plate after the wells have been filled is removed by a doctor blade prior to the printing process, so that the surface is ink-free and does not produce tones during printing. For correct image reproduction and tone rendering during gravure printing, the form of the ink-holding depressions in the printing plate surface is thus of critical importance. Undesirable depressions in the printing plate surface, for example defective wells as well as scratches, scrapes, holes or other damage to the printing plate surface, which may occur during the printing process, will likewise be filled with ink during inking of the gravure printing plate and will consequently be visible in the printed image, reducing the quality of the printed material or even making the latter useless.

To avoid printing or toning by such undesirable and defective depressions in the printing plate surface, the said depressions must be eliminated with appropriate correction of the gravure printing plate. Such correction of gravure printing plates is referred to as negative correction or minus correction. One method for negative correction of gravure printing plates is polishing and grinding of the printing plate surface with fine polishing and grinding materials. This method can be used for fine, slight scratches or the like but is expensive for extensive negative corrections and may lead to undesirable tone shifts or, for example if defective wells or extensive damage to the printing plate surface have to be eliminated, cannot be used at all.

Other known methods for negative correction are the electroplating correction method and the coating correction method. In the electroplating correction method, copper is deposited electrochemically onto the areas to be corrected. Since the copper is deposited not only in the undesirable depressions but also on the printing plate surface, subsequent after treatment of the gravure printing plate to remove the unnecessary copper layer is unavoidable. Furthermore, this method of negative correction can only be used for the conventional metal gravure printing plates having a Ballard skin. In the coating correction method, solvent-free coatings are introduced into the correction point by means of a doctor blade. Different coating viscosities result in different correction effects. The coatings must be cured afterwards and their properties must be matched with the printing plate material.

In another proposed method for correcting gravure printing plates, the depressions to be corrected in the gravure printing plate are filled with a photosensitive material, which is subsequently cured and aftertreated (cf. DE-A-No. 20 54 833, JP-A-No. 55 157 742 and JP-A-No. 55 140 846). Both the coating correction and the method for correction by means of photosensitive materials have frequently proven too expensive in practice and not completely satisfactory.

It is an object of the present invention to provide a novel, simple and widely applicable method for negative correction of gravure printing plates which has advantages over the known prior art correction methods.

We have found, surprisingly, that this object is achieved according to the invention by using, for the negative correction of gravure printing plates, a pasty material which is viscoplastic at room temperature and is based on a dispersion of a solid, highly fluorinated olefin polymer powder in an inert, sparingly volatile, organic dispersing liquid.

The present invention accordingly relates to a method for the negative correction of gravure printing plates by filling undesirable depressions in the printing layer of the gravure printing plate with a correcting agent, wherein the correcting agent used is a pasty material which is viscoplastic at room temperature and is based on a dispersion of a solid, highly fluorinated olefin polymer powder in an inert, sparingly volatile, organic dispersing liquid.

The present invention furthermore relates to a correcting agent for the negative correction of gravure printing plates for use in the abovementioned method, consisting of a pasty material which is viscoplastic at room temperature and is based on a dispersion of a solid, highly fluorinated olefin polymer powder in an inert, sparingly volatile, organic dispersing liquid.

For the purposes of the present invention, gravure printing plates are printing plates, printing foils or printing cylinders which contain the ink-conveying image parts for printing in the form of depressions (wells) in the surface of the printing layer. These include the conventional metal gravure printing plates having a Ballard skin and advantageously also the gravure printing plates having plastic printing layers, in which a plastic layer is applied to a suitable printing layer base, the inkholding wells having been made into the said plastic layer either by mechanical engraving or laser engraving (cf. for example DE-A-27 52 500 or DE-A-30 28 098) or photomechanically by imagewise exposure and development of a suitable photosensitive recording material (cf. for example DE-A-No. 20 61 287, EP-A-No. 70 510 and EP-A-No. 70 511). For the purposes of the present invention, undesirable impressions in the printing layer are all depressions in the surface of the printing layer which accept ink during inking of the gravure printing plate and accordingly produce tones during printing but which do not belong to the ink-conveying image parts of the gravure printing plate. These undesirable depressions in the printing layer include, for example, wells introduced erroneously into the printing layer, as well as scratches, furrows, holes or other damage to the printing plate surface, as frequently occur during use of the gravure printing plate in the printing press.

The correcting agents to be used according to the invention are stiff, pasty dispersions of solid, highly fluorinated, preferably perfluorinated, olefin polymer powders in inert, sparingly volatile, organic dispersing liquids, the said dispersions being viscoplastic at room temperature. Suitable highly fluorinated olefin polymers are both highly fluorinated homopolymers and highly fluorinated copolymers of olefins, in particular of ethylene and of propylene, as well as highly fluorinated olefin polymers which contain ether groups in the polymer main chain. Examples of such ether groups which may be incorporated in the polymer main chain of the highly fluorinated olefin polymers, in general in a minor amount, are the (—$CF_2$—0—), (—$CF_2$—$CF_2$—0—) and (—$CF(CF_3)$—$CF_2$—0—) groups. As a rule, the dispersions to be used according to the invention as correcting agents contain solid, powdered homo- or copolymers of highly fluorinated, in particular perfluorinated, ethylene or highly fluorinated, in particular perfluorinated, propylene. These include, in particular, polytetrafluoroethylenes, polyhexafluoropropylenes and hexafluoroethylene/hexafluoropropylene copolymers. The solid, highly fluorinated olefin polymer powders present in the dispersions to be used according to the invention as correcting agents are finely divided and may contain, in addition to fluorine, a minor amount of other halogen atoms, in particular chlorine atoms. Preferably, the solid, highly fluorinated olefin polymer powders are perhalogenated, in particular perfluorinated.

The viscoplastic, pasty dispersions to be used according to the invention as correcting agents contain, as further components in addition to the highly fluorinated olefin polymer powders, one or more inert, sparingly volatile, organic liquids, which act as dispersants for the said olefin polymer powders. Examples of suitable dispersing liquids of this type are high boiling fluorohydrocarbon oils, fluorinated polyether oils, silicone oils or greases or fluorosilicone oils. The inert dispersing liquids are generally sparingly volatile oils but may also be lubricating greases. They possess high heat stability and as a rule their viscosity shows little temperature dependence. They are chemically stable and have a boiling point in general above 150° C., preferably above 200° C. Examples of the inert, sparingly volatile, organic dispersing liquids are the appropriate, conventional fluorinated hydrocarbon oils; highly fluorinated, preferably perfluorinated, polyalkylene ether oils, preferably those polyether oils which are composed of repeating oxyperfluoroalkylene units of the formulae —$CF_2$—0—, —$C_2F_4$—0—No. and/or $C_3F_6$—0—, as described, for example, in DE-A-No. —26 33 736 or commercially available under the trade name FOMBLIN; silicone oils or greases, for example those of the polysiloxane type, for example polyphenylmethylsiloxane, or of the type comprising the net-like silicone polymers, for example methylsilicone polymers of oily or greasy consistency; and corresponding fluorinated silicone oils or greases. For the dispersing liquids, the stated oils or greases can be used alone or as a mixture with one another.

The dispersions to be used according to the invention as correcting agents can be prepared in a conventional manner by thorough mixing, for example stirring or kneading, of the individual components. The solid, highly fluorinated olefin polymer powders and the inert, sparingly volatile, organic dispersing liquids are chosen with regard to type and amount, and matched up with one another, in such a way that a stable dispersion of the said polymer powder in the said dispersing liquid is formed, and this dispersion is viscoplastic and has a stiff, pasty consistency at room temperature, so that it is deformable under the action of pressure and shearing force but is not freeflowing. The dispersions to be used according to the invention as correcting agents are usually solvent-free, and the weight ratio of the said polymer powder to the said dispersing liquid in the dispersions is from about 3:7 to 6:4.

Examples of dispersions which are particularly suitable according to the invention as correcting agents for the negative correction of gravure printing plates are pasty, viscoplastic dispersions of polytetrafluoroethylene powder in perfluoropolyalkylene ether oils of the abovementioned type in a weight ratio of polymer to oil of about 35:65, and pasty, viscoplastic dispersions of polytetrafluoroethylene powder in silicone oil, for example polyphenylmethylsiloxane, in a weight ratio of polymer to oil of about 1:1.

The method according to the invention can be carried out easily and without problems by simply smearing or pressing the said dispersions into the undesirable depressions in the printing layer, for example by means of a spatula, a scraper or another suitable spreading apparatus which permits the viscoplastic, pasty dispersion to be pressed into the undesirable depressions. For the negative correction of the gravure printing plates, the undesirable depressions in the printing layer are completely filled with the viscoplastic, pasty dispersion to be used according to the invention as a correcting agent, and excess correcting agent can simply be wiped off from the printing plate surface.

The said dispersions adhere to metallic and plastic surfaces, so that, when used according to the invention, a stable bond is formed between the correcting agent and the printing layer in the depressions filled for correction. Since the viscoplastic, pasty dispersions to be used according to the invention as correcting agents do not harden or change in any other way, for example by shrinkage, the desired effect is completely retained during the entire print run. In particular, the said dispersions are completely resistant to the printing ink solvents, i.e. they neither swell nor soften nor change in their other properties. Furthermore, they also have no affinity for the gravure printing inks, permitting the surface ink to be removed easily by means of the doctor blade from the corrected areas too after inking of the gravure printing plate, so that the corrected areas do not produce tones during printing. Moreover, the viscoplastic, pasty dispersions to be used according to the invention as correcting agents are completely toxicologically acceptable and very heat-stable, i.e. they do not change at temperatures up to 200° C. or higher. Another advantage is that their surface adapts to the requirements in the press during the printing process, even under the action of the impression cylinder and doctor blade. The novel method for the negative correction of gravure printing plates is therefore universally and widely applicable in all cases where undesirable depressions in the printing layer have to be completely eliminated or filled, and can be simply and successfully carried out in practice. If desired or necessary, a negative correction made using the said dispersion can even be eliminated again by simply removing the correcting agent. The novel method has proven particularly advantageous for eliminating scratches, scrapes, furrows, holes and other damage to the printing plate surface, as may occur when the gravure printing plates are used in the printing process.

I claim:

1. A method for the negative correction of gravure printing plates by filling undesirable depressions in the printing layer of the gravure printing plate with a correcting agent, wherein the correcting agent used is a pasty material which is viscoplastic at room temperature and is based on a dispersion of a solid, highly fluorinated olefin polymer powder in an inert, sparingly volatile, chemically stable, highly heat stable, organic dispersing liquid having a boiling point above 150° C.

2. The method of claim 1, wherein the dispersion contains solid, perfluorinated ethylene or propylene homo- or copolymer powders.

3. The method of claim 2, wherein the dispersion contains, as the solid, perfluorinated olefin polymer powder, polytetrafluoroethylene, polyhexafluoroethylene, a tetrafluoroethylene/hexafluoropropylene copolymer or a mixture of these.

4. The method of claim 1, wherein the dispersion contains, as the inert, sparingly volatile, organic dispersing liquid, fluorohydrocarbon oils highly fluorinated polyether oils, silicone oils or greases or fluorosilicone oils serving as a dispersant for the solid, highly fluorinated olefin polymer powders.

5. The method of claim 4, wherein the dispersion contains, as the inert, sparingly volatile, organic dispersing liquid, fluorohydrocarbon oils highly fluorinated which is composed of repeating oxyperfluoroalkylene units of the formulae —$CF_2$—0—, —$C_2F_4$—0— and/or —$C_3F_6$—O—, or a mixture of such oils.

6. The method of claim 4, wherein the dispersion contains, as the inert, sparingly volatile, organic dispersing liquid, unfluorinated or fluorinated polysiloxanes of oily or greasy consistency.

7. The method of claim 1, wherein the dispersion contains the solid, highly fluorinated olefin polymer powders and the inert, sparingly volatile, organic dispersing liquid in a weight ratio of about 3:7 to 6:4.

8. The method of claim 1, wherein the correcting agent used is a viscoplastic, pasty dispersion of polytetrafluoroethylene powder in a perfluoropolyalkylene ether oil which is composed of repeating oxyperfluoroalkylene units of the formulae —$CF_2$—0—, —$C_2F_4$—0— or $C_3F_6$—0— and mixtures thereof, in a weight ratio of polytetrafluoroethylene to perfluoropolyalkylene ether oil of about 35:65.

9. The method of claim 1, wherein the correcting agent used is a viscoplastic, pasty dispersion of polytetrafluoroethylene powder in polysiloxane, in particular polyphenylmethylsiloxane, in a weight ratio of polytetrafluoroethylene to polysiloxane of about 1:1.

10. The method of claim 1, wherein the viscoplastic, pasty dispersion to be used according to the invention as a correcting agent is smeared or pressed into the undesirable depressions by mechanical means.

11. The method of claim 10, wherein the mechanical means is a spatula or scraper.

12. The method of claim 9, wherein the polysiloxane is polyphenylmethylsiloxane.

13. The method of claim 1, wherein the dispersing liquid has a boiling point above 200° C.

* * * * *